No. 797,876. PATENTED AUG. 22, 1905.
G. W. TIDRICK.
DUST PROOF JOINT.
APPLICATION FILED FEB. 3, 1905.
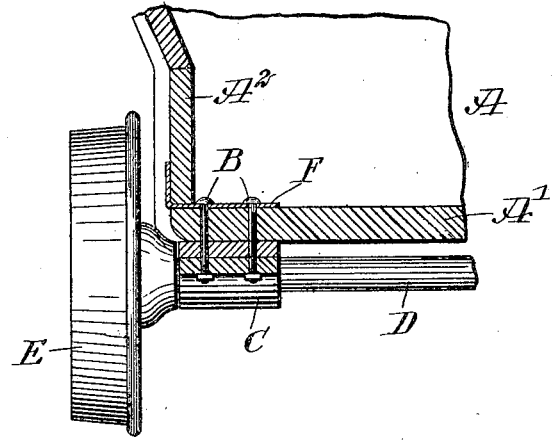
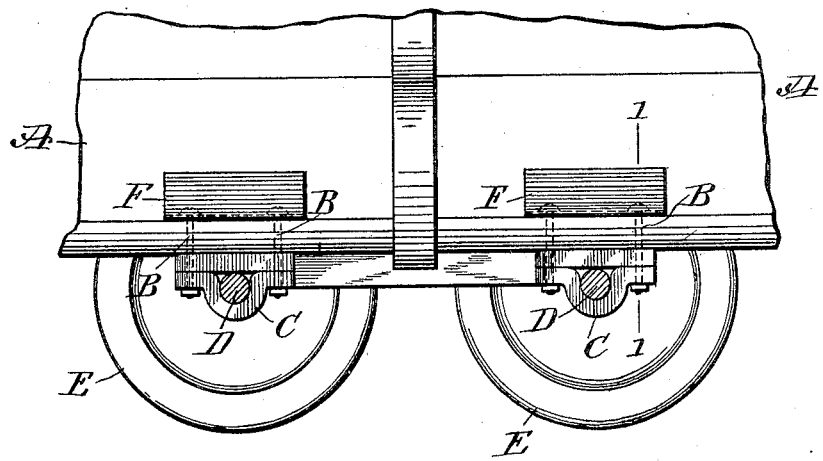
WITNESSES:
J. A. Brophy
Rev. J. Hoster
INVENTOR
George W. Tidrick
BY
Munn
ATTORNEYS

UNITED STATES PATENT OFFICE.

GEORGE W. TIDRICK, OF DILLONVALE, OHIO.

DUST-PROOF JOINT.

No. 797,876.  Specification of Letters Patent.  Patented Aug. 22, 1905.

Application filed February 3, 1905. Serial No. 244,018.

*To all whom it may concern:*

Be it known that I, GEORGE W. TIDRICK, a citizen of the United States, and a resident of Dillonvale, in the county of Jefferson and State of Ohio, have invented a new and Improved Dust-Proof Joint, of which the following is a full, clear, and exact description.

The object of the invention is to provide a new and improved dust-proof joint more especially designed for use in mine-cars and similar cars and arranged to protect the bearing of the axles from injury by the coal-dust or other fine particles of the load passing to the bearing-surfaces.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a cross-section of the improvement as applied to a mine-car, the section being on the line 1 1 of Fig. 2; and Fig. 2 is a side elevation of the same, the axles of the car being shown in section.

The mining-car illustrated in the drawings consists of the usual body A, to the under side of which are secured by bolts B bearings C for axles D, carrying car-wheels E. Over each of the bearings, as illustrated in Fig. 2, is arranged a dust-proof plate F, made L-shaped in cross-section and having its horizontal member extending on the upper face of the car-floor A', and this horizontal member is engaged by the bolts B, so as to securely fasten the plate F in position on the car-body. The horizontal member of the plate F extends under the corresponding side $A^2$ of the car-body, and the vertical member of the said plate fits against the outer face of the said side $A^2$, as plainly indicated in the drawings. Each of the plates F is preferably of a length somewhat in excess of the car-bearing C.. (See Fig. 2.)

By the arrangement described it will be seen that in case the sides $A^2$ move with their lower edges out of engagement with the upper surface of the car-floor A and form minute slits for the passage of the coal-dust and other fine particles then the plates F by being arranged and located as described prevent such coal-dust or other fine particles from dropping down over the outer edge of the car-floor A' down onto the bearings C, as the upwardly-extending or vertical member of the plate F prevents such movement, and any coal-dust or other fine particles that pass over the plate F can only drop over the ends thereof, completely free of the bearings C, so as not to injure the same.

It is understood that coal-dust or other fine particles passing onto the bearings cause undue wear on the bearing-surfaces, to the great detriment of the proper running of the car.

Having thus described my invention, I claim as new and desire to secure by Letters Patent—

1. In a car, the combination with a car-body, the wheels, and bearings on the under side of the body, of a plurality of L-shaped metallic plates secured to the body, one over each bearing, each plate having its vertical member fitting against the outer face of the side of the body and its horizontal member extending under the lower edge of the side, between it and the floor, and onto said floor, the horizontal member of the plate being of a width about equal to the length of a bearing, and bolts passed through the horizontal member of each plate, the floor and a bearing substantially as herein shown and described.

2. In a car, the combination with the car-body, the car-wheels and their bearings, of a dust-proof plate made L shape and arranged over a bearing, the plate having its horizontal member extending on the floor of the car-body and under the side thereof between the side and floor, and the vertical member fitting against the outer face of the side of the car-body, and means for fastening the bearing to the car-body, said means also serving to secure the plate in position on the car-body.

3. In a car, the combination with the car-body, the car-wheels and their bearings, of a dust-proof plate made L shape and arranged over a bearing, the plate having its horizontal member extending on the floor of the car-body and under the side thereof between the side and floor, and the vertical member fitting against the outer face of the side of the car-body, and bolts for securing the bearings to the floor of the car-body, said bolts also serving to secure the horizontal member of the plate to the car-floor.

In testimony whereof I have signed my name to this specification in the presence of two subscribing witnesses.

GEORGE W. TIDRICK.

Witnesses:
 MILTON HORTON,
 GEO. A. CIRBY.